No. 760,516. PATENTED MAY 24, 1904.
H. BAUMGARTNER & J. ZIEGLER.
FRICTION CLUTCH.
APPLICATION FILED NOV. 9, 1901.
NO MODEL.

Witnesses

Inventors
Hugo Baumgartner
Jules Ziegler
BY
Attorneys

No. 760,516. Patented May 24, 1904.

UNITED STATES PATENT OFFICE.

HUGO BAUMGARTNER AND JULES ZIEGLER, OF BASLE, SWITZERLAND.

FRICTION-CLUTCH.

SPECIFICATION forming part of Letters Patent No. 760,516, dated May 24, 1904.

Application filed November 9, 1901. Serial No. 81,779. (No model.)

*To all whom it may concern:*

Be it known that we, HUGO BAUMGARTNER and JULES ZIEGLER, citizens of Switzerland, residing at Basle, Switzerland, have invented certain new and useful Improvements in Friction-Clutches, of which the following is a specification.

This invention relates to friction-clutches; and it has for its object to provide a construction wherein the clutch-shoes may be operated with an expenditure of a minimum of energy with a maximum gripping effect, other objects and advantages of the invention being evident from the following description.

Figure 1:
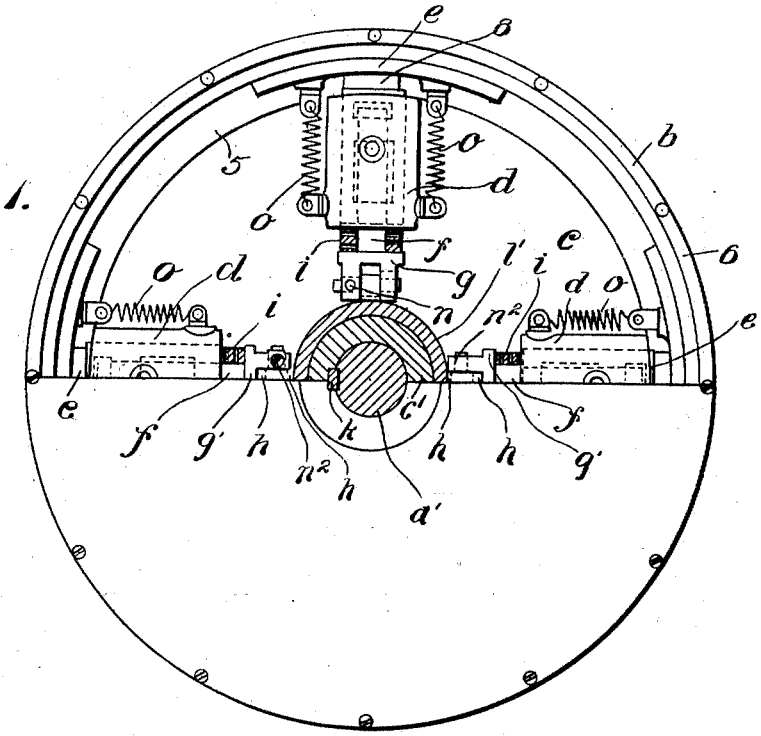
Figure 2:
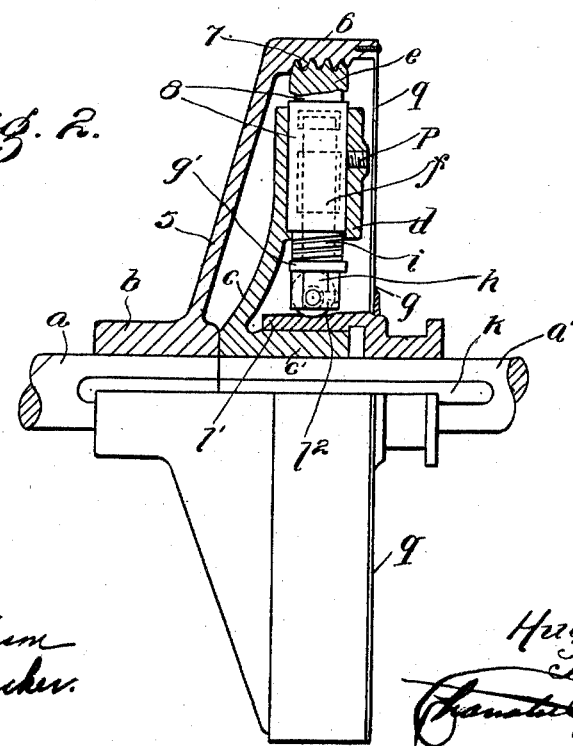

In the drawings forming a portion of this specification, and in which like characters of reference indicate similar parts in both views, Figure 1 is a front elevation of a clutch mechanism embodying the present invention, the lower half of the casing being in place and the upper half of the tapered sleeve and the hub of the inner wheel being in vertical section. Fig. 2 is a view showing the upper half of the clutch mechanism in vertical section and the lower half in side elevation.

Referring now to the drawings, there are shown two shafts $a$ and $a'$, of which the former is the driving-shaft and the latter the driven shaft. Upon the driving-shaft $a$ is mounted fixedly the hub $b$ of a wheel comprising the web 5 and the laterally-directed flange 6 at the outer edge of the latter and which encircles and is concentric to the shaft $a'$. The inner face of the flange 6 is corrugated transversely, as shown at 7, to give a better gripping-surface, and these corrugations are in the form of inwardly-directed cross-sectionally triangular ribs. Mounted upon the driven shaft $a'$ and held thereon against rotation by the spline $k$ is the hub $c'$ of what may be termed a "second" wheel, including a web $c$. Upon the web $c$ at the opposite side from the web 5 is a series of sleeves $d$, in each of which is slidably mounted the stem 8 of a brake-shoe $e$ of arc shape and the outer face of which is corrugated to mesh with the corrugated inner face of the flange 6, so that when the brake-shoes are forced outwardly into close contact with the flange 6 they will hold to the flange by friction, and thus lock the inner clutch member on the shaft $a'$ to rotate with the outer clutch member on the shaft $a$.

The stems 8 of the clutch-shoes are socketed to slidably receive plungers $f$, having eccentrically-mounted rollers $h$ in their lower ends and above which are shoulders $g'$. A helical spring $i$ is disposed upon each of the plungers between the shoulder $g'$ and the stem of the corresponding brake-shoe, so that when the plungers are forced radially to move the brake-shoes into engagement with the flange 6 the springs $i$ may be slightly compressed, so that there will not be a too sudden gripping of the brake-shoes, a further object of the springs being presently explained.

To move the plungers outwardly, a tapered sleeve $l'$ is provided and is slidably mounted upon the shaft $a'$, upon which it is held against rotation by the spline $k$, and this sleeve is adapted to be forced between the hub $c'$ and the eccentric rollers, during which movement the rollers are rotated, and as they move up the inclined face of the sleeve they are pressed outwardly to correspondingly move the plungers and the brake-shoes. In the movement of the sleeve the spring $i$ is compressed after engagement of the brake-shoe, and in the sleeve are depressions $l^2$, one for each of the rollers $h$, and which are so positioned that when proper pressure has been applied to the springs the rollers will enter the depressions and remain therein until the sleeve is forcibly moved in the opposite direction. Thus is the clutch held against accidental displacement of the parts such as would release the mechanism.

To prevent outward movement of the clutch-shoes by centrifugal force, helical springs $o$ are connected to the shoes and to lugs upon the sleeves $d$, as illustrated, the tension of these springs being such as to overcome any centrifugal tendency, while not interfering in any marked degree with the operation of the clutch mechanism.

What is claimed is—

1. In a clutch mechanism, the combination with a clutch-shoe, of a plunger slidably engaged therewith, a spring between the plunger and shoe for transmitting energy from the former to the latter, and a wedge disposed for engagement with the plunger to force the latter outwardly and operate the shoe, said wedge having a depression to receive the plunger when the shoe is in active position.

2. In a clutch mechanism, the combination with a member having a clutch-face, of a second member having sleeves thereon, clutch-shoes having stems slidably mounted in the sleeves, said stems having sockets, plungers slidably engaged in the sockets of the stems, springs disposed between the plungers and stems to transmit energy from the former to the latter, and a tapered sleeve disposed for movement between the several plungers to force them outwardly and compress the springs to actuate the shoes, said sleeve having recesses to receive the plungers when the shoes are in active positions.

3. In a clutch mechanism, the combination with a member having a clutch-face, of a second member having sleeves thereon, clutch-shoes having stems slidably mounted in the sleeves, said stems having sockets, plungers slidably engaged in the sockets of the stems, springs disposed between the plungers and stems to transmit energy from the former to the latter, and rolls eccentric to their axles carried by the plungers and disposed for movement upon a tapered sleeve which is movable axially upon the driven disk, said sleeve having recesses to receive the rolls when the brake-shoes are in active positions.

In testimony whereof we have hereunto set our hands in the presence of two witnesses.

HUGO BAUMGARTNER.
JULES ZIEGLER.

Witnesses:
GEORGE GIFFORD,
H. BALLIGER.